(12) United States Patent
Roberge et al.

(10) Patent No.: US 12,336,455 B2
(45) Date of Patent: Jun. 24, 2025

(54) AGRICULTURAL RAKING SYSTEM AND METHOD FOR AUTOMATIC SETTINGS

(71) Applicant: CNH Industrial America LLC, New Holland, PA (US)

(72) Inventors: Martin J. Roberge, Saskatoon (CA); David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 1041 days.

(21) Appl. No.: 17/318,626

(22) Filed: May 12, 2021

(65) Prior Publication Data
US 2021/0352836 A1  Nov. 18, 2021

Related U.S. Application Data

(60) Provisional application No. 63/025,547, filed on May 15, 2020.

(51) Int. Cl.
*A01D 78/10* (2006.01)
*A01D 78/00* (2006.01)
*A01D 84/00* (2006.01)

(52) U.S. Cl.
CPC ....... *A01D 78/1071* (2013.01); *A01D 78/001* (2013.01); *A01D 84/00* (2013.01)

(58) Field of Classification Search
CPC ........ A01D 78/00–78/20; A01D 84/00; A01D 80/00–80/02
See application file for complete search history.

(56) References Cited

U.S. PATENT DOCUMENTS 4,128,987 A * 12/1978 Zweegers .......... A01D 78/1078
  56/366
4,700,535 A * 10/1987 Wessel ............... A01D 78/1092
  56/366

(Continued)

FOREIGN PATENT DOCUMENTS

CN  105432240 A  3/2016
DE  102005005557 A1 *  8/2006  ........... A01B 79/005

(Continued)

OTHER PUBLICATIONS

Extended European Search Report for European Application No. 21172026.3 dated Oct. 8, 2021 (11 pages).

*Primary Examiner* — Adam J Behrens
*Assistant Examiner* — Madeline I Runco
(74) *Attorney, Agent, or Firm* — Peter K. Zacharias; Rebecca L. Henkel; Rickard K. DeMille

(57) ABSTRACT

A system includes an agricultural raking vehicle, including a motor drive and raking members mechanically coupled to the motor drive. The raking members rake agricultural product via rotation about an axis substantially orthogonal to a field on which the agricultural vehicle travels. The system also includes a sensor assembly that outputs a signal indicative of a determined windrow quality of the agricultural product raked by the raking members. The system also includes a controller communicatively coupled to the motor drive and to the sensor assembly. The controller receives the signal and controls an angular speed of the motor drive, a ground speed of the agricultural vehicle, and/or a height of the raking members or tines above the field, based on a comparison of the determined windrow quality to a target windrow quality.

18 Claims, 12 Drawing Sheets

(56) References Cited

U.S. PATENT DOCUMENTS

| | | | |
|---|---|---|---|
| 6,463,726 B1 * | 10/2002 | Helfer | A01D 78/1085 |
| | | | 56/370 |
| 6,915,197 B2 | 7/2005 | Van der Lely | |
| 7,765,780 B2 | 8/2010 | Koselka et al. | |
| 9,839,180 B2 | 12/2017 | Esch et al. | |
| 2002/0011056 A1 * | 1/2002 | Lely | A01D 75/28 |
| | | | 56/10.2 E |
| 2002/0014059 A1 | 2/2002 | Lely et al. | |
| 2018/0325032 A1 | 11/2018 | Rotole et al. | |
| 2021/0307228 A1 * | 10/2021 | Egelund | A01D 78/1064 |
| 2023/0345879 A1 * | 11/2023 | Sasamoto | G07C 5/02 |

FOREIGN PATENT DOCUMENTS

| | | | | |
|---|---|---|---|---|
| DE | 102014108947 B4 * | 2/2016 | | A01D 41/127 |
| DE | 102005005557 C5 * | 3/2019 | | A01B 79/005 |
| DE | 102018213212 A1 * | 2/2020 | | |
| EP | 0554200 A1 | 8/1993 | | |
| EP | 2272312 B1 * | 6/2012 | | A01B 69/003 |
| EP | 2517543 A2 | 10/2012 | | |
| EP | 2850934 A2 | 3/2015 | | |
| EP | 3357323 A1 | 8/2018 | | |
| EP | 3607813 A1 | 2/2020 | | |
| GB | 1569278 A * | 6/1980 | | A01D 78/1078 |
| WO | 2019/129335 A1 | 7/2019 | | |

\* cited by examiner

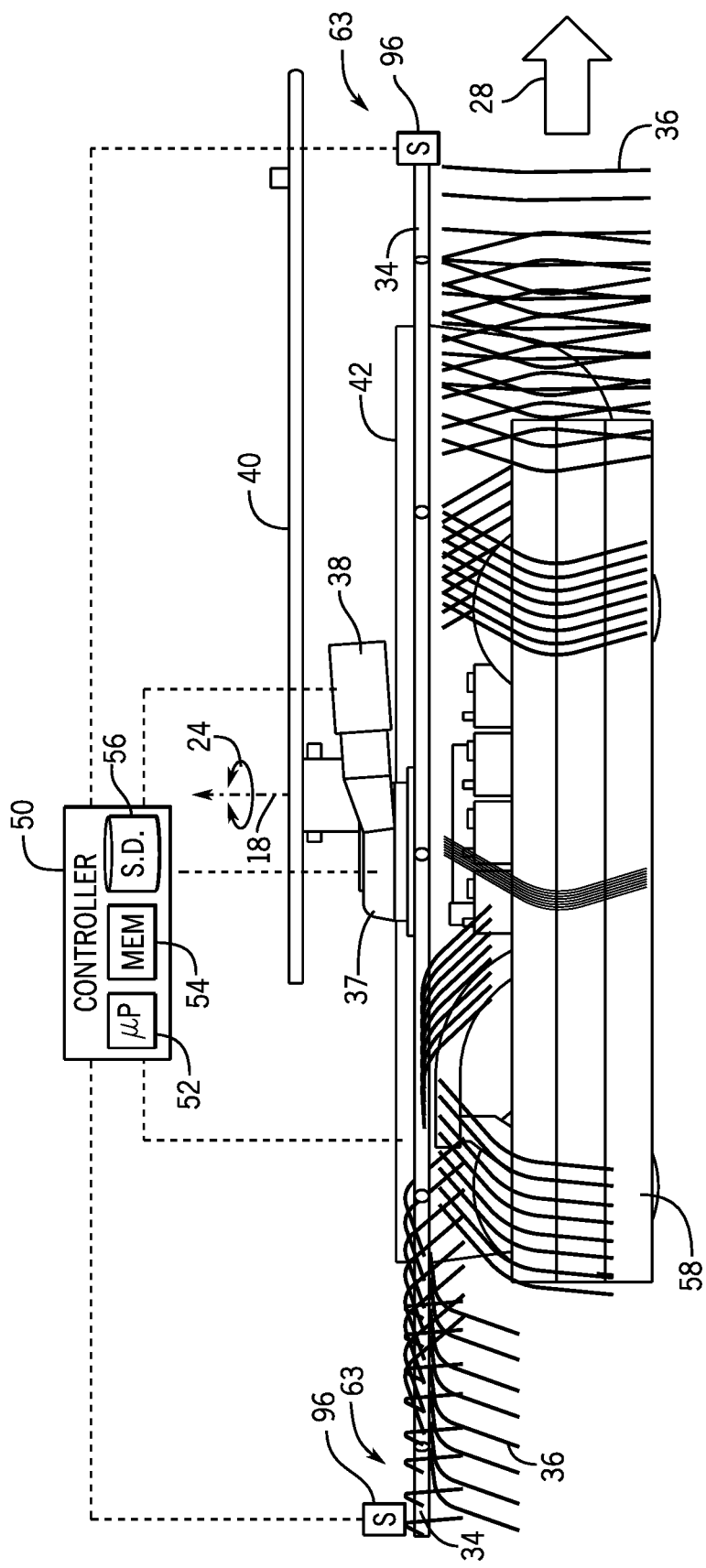
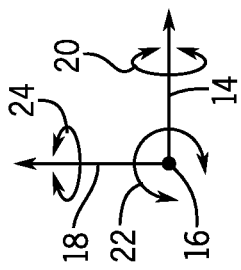
FIG. 6

AGRICULTURAL RAKING SYSTEM AND METHOD FOR AUTOMATIC SETTINGS

BACKGROUND

The present disclosure relates generally to an agricultural raking system and method.

An agricultural implement may be coupled to a tractor or other work vehicle and moved through a field to perform an agricultural task (e.g., tilling, planting, seeding, spraying, fertilizing, harvesting, etc.). The implement may be towed behind the tractor/work vehicle or mounted to the tractor/work vehicle. A user may operate the tractor and, therefore, control movement of the agricultural implement through the field to perform the agricultural task. Accordingly, performance of the agricultural task may be limited to the hours during which the user performs the agricultural task. For example, the agricultural task may only be performed during times of the day when there is sufficient sunlight for the user to see.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a system includes an agricultural raking vehicle that includes a motor drive and raking members mechanically coupled to the motor drive. The raking members are configured to rake agricultural product via rotation about an axis substantially orthogonal to a field on which the agricultural vehicle travels. Each raking member includes tines. The system also includes a sensor assembly that outputs a signal indicative of a determined windrow quality of the agricultural product raked by the raking members. The system also includes a controller communicatively coupled to the motor drive and to the sensor assembly. The controller includes a memory and a processor. The controller is configured to receive the signal and control an angular speed of the motor drive, a ground speed of the agricultural vehicle, or a height of the raking members or tines above the field, or a combination thereof, based on a comparison of the determined windrow quality to a target windrow quality.

DRAWINGS

These and other features, aspects, and advantages of the present disclosure will become better understood when the following detailed description is read with reference to the accompanying drawings in which like characters represent like parts throughout the drawings, wherein:

FIG. 6 is a schematic side view of the agricultural raking system of FIG. 1, in which the agricultural raking vehicle of FIG. 4 includes the flexible shield of FIG. 4, in accordance with aspects of the present disclosure;

DETAILED DESCRIPTION

Figure 1:
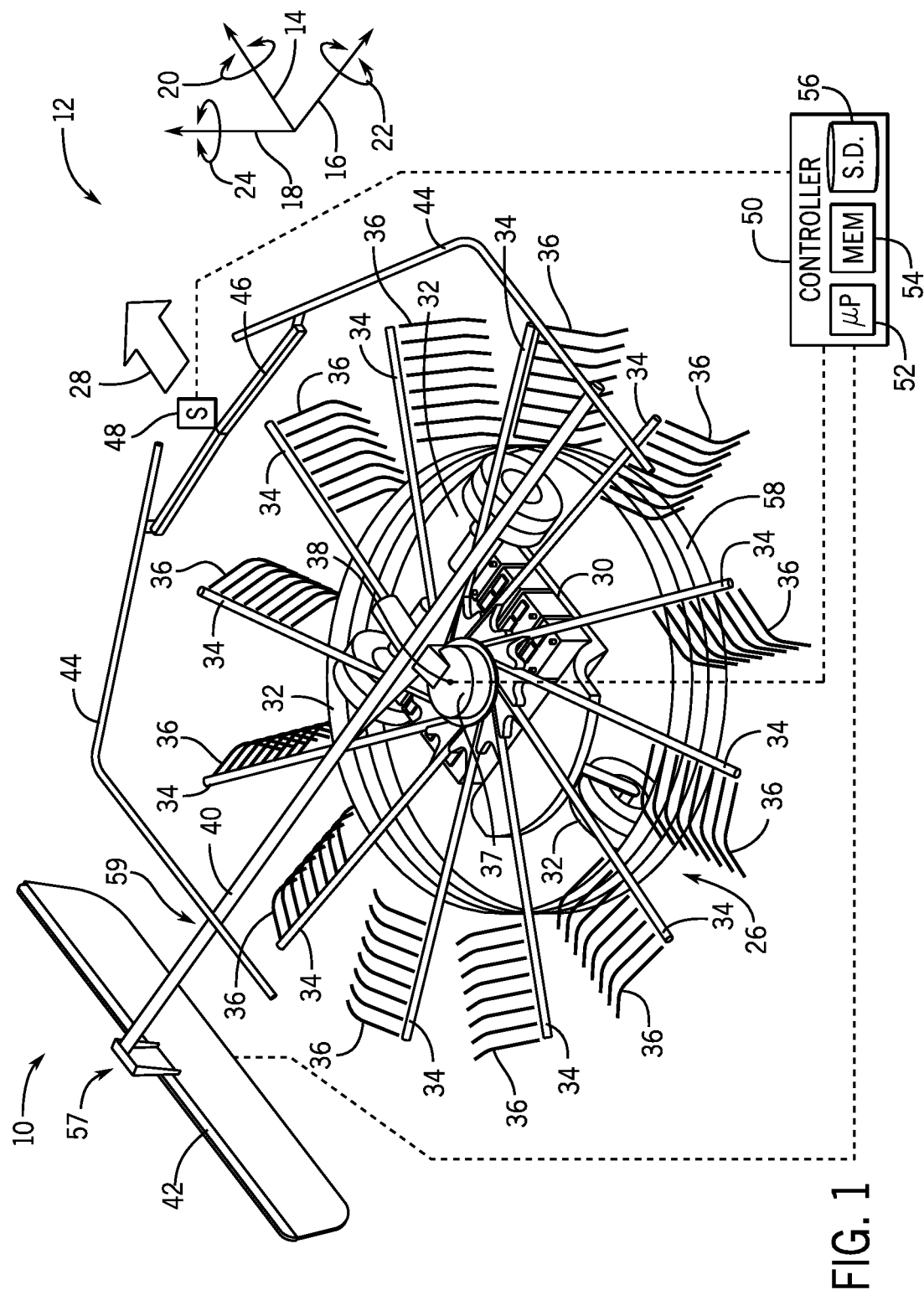
FIG. 1 is a schematic perspective view of an embodiment of an agricultural raking system, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A tractor or other work vehicle may tow an agricultural rake implement through a field to perform an agricultural task, such as raking agricultural product on the field. A user may operate the tractor/work vehicle to move the agricultural rake through the field to perform the raking task. The agricultural rake may be used to collect cut agricultural product (e.g., hay, straw, etc.) into organized piles of agricultural product (hereinafter "windrows") for later collection (e.g. by a baler or a loader wagon). The agricultural rake may expand the agricultural product to a target consistency and turn the agricultural product over so that the agricultural product may dry. The agricultural rake may be utilized in the evening to protect the agricultural product from morning dew. The next day a tedder may be used to spread it again, so that the hay dries more quickly.

A user may operate the tractor/work vehicle coupled to the agricultural rake. Therefore, the user may control movement of the agricultural rake through the field to perform manual raking operations. Performance of the manual raking operations may be limited to the hours during which the user performs the agricultural task. For example, the agricultural task may only be performed during times of the day when there is sufficient sunlight for user visibility. Furthermore, manual raking operations typically include the task of driving the tractor/work vehicle, which moves the agricultural rake. Therefore, certain agricultural operations may improve from an autonomous or semiautonomous raking system that enhances the quality, flexibility and efficiency of raking operations.

Present embodiments are direct to systems and methods for adjusting (e.g., autonomous self-adjusting) an agricultural raking system to improve windrow quality. As used herein, "windrow quality" may refer to the characteristics of the shape of the agricultural product raked in the windrow, as well as the condition of the field where the crop should not be placed. For instance, when there is a significant quantity of agricultural product remaining unraked on the field after the agricultural raking vehicle passes over the agricultural product, a controller may determine that the windrow quality is below a target threshold for target windrow quality (e.g., because the agricultural raking vehicle left agricultural product unraked.

An agricultural raking vehicle may include multiple tines connected to a common rotatable drive (e.g., a motor), which is configured to control rotation of the tines. The tines may engage with agricultural product on the field to direct it toward a deflector of the agricultural raking vehicle configured to form the windrow. A controller may be communicatively coupled to various components of the agricultural raking vehicle, including the rotatable drive and deflector, to control certain operations of the agricultural raking vehicle, such as driving, steering, stopping, and performing raking operations, among others. The controller may control the quality of the windrows (hereinafter "windrow quality") by adjusting certain operating parameters (e.g., agricultural raking vehicle ground speed, engine power output, height of the tines, orientation of the tines, rotatable speed or power output of the rotatable drive controlling rotation of the tines, and/or deflector position). The windrow quality may be determined by sensors (e.g., ultra-sound sensors configured to measure the front and rear profiles) comparing the front agricultural product to the rear agricultural product (e.g., organized as a windrow).

In certain embodiments, the agricultural raking vehicle may be self-operated, such that it is not hauled by a work vehicle. In other embodiments, the agricultural raking vehicle may be towed by a work vehicle. When the agricultural raking vehicle is towed by the work vehicle, the controller may send control signal to adjust the operating parameters by actuating components of the work vehicle, the agricultural raking vehicle, or both. When the agricultural raking vehicle is self-operated, the controller may send control signals to adjust the operating parameters by actuating components of the agricultural raking vehicle.

With this in mind, FIG. 1 is a schematic perspective view of an embodiment of an agricultural raking system 10, in accordance with aspects of the present disclosure. To facilitate discussion, FIG. 1 includes a coordinate system 12 having a longitudinal axis 14, a lateral axis 16, and a vertical axis 18, and rotation about these axes is defined by rotation directions 20, 22, and 24, respectively. The agricultural raking system 10 includes an agricultural raking vehicle 26 configured to travel along a direction of travel 28 through a field. In certain embodiments, the agricultural raking vehicle 26 includes a chassis 30 configured to support various components of the agricultural raking vehicle 26, as illustrated in FIG. 1. For example, the chassis 30 may be configured to house/support a motor (e.g., diesel engine, electric motor, etc.), a hydraulic system (e.g., including a pump, valves, reservoir, etc.), and other components (e.g., an electrical system, a cooling system, etc.) that facilitate operation of the agricultural raking vehicle 26. In addition, the chassis 30 is configured to support wheels 32. The wheels 32 may be driven to rotate by the motor and/or by component(s) of the hydraulic system (e.g., hydraulic motor(s), etc.). In certain embodiments, the wheels 32 are independently driven and controlled. For example, the front wheels may be independently controlled (e.g., driven, steered, etc.), and the back wheel may be a caster wheel (e.g., a freely pivoting caster wheel, a controlled caster wheel, etc.). While the illustrated agricultural raking vehicle 26 includes three wheels 32, in alternative embodiments, the agricultural raking vehicle may include any suitable number of wheels (e.g., four, six, etc.) in any suitable configuration, tracks, or a combination of wheels and tracks.

In the illustrated embodiment, the agricultural raking vehicle 26 includes twelve raking members 34. However, in other embodiments, the agricultural raking vehicle 26 may include any suitable number of raking members 34 (e.g., one, two, three, four, six, eight, ten, twenty, thirty, etc.). Each raking member 34 includes multiple tines 36 configured to engage with agricultural product on the field. The chassis 30 may support a motor drive 38 configured to control rotation of the raking members 34 about the vertical axis 18 along the third rotation direction 24. In certain embodiments, the raking members 34 are rigidly coupled to a rotor 37 of the motor drive 38, such that the raking members 34 rotate with the rotor 37 of the motor drive 38.

The agricultural raking vehicle 26 may include one or more rotors 37. In some embodiments, multiple rotors may be configured to adjust the raking members 34 to converge agricultural product into one large windrow or sweep crops laterally into a corresponding windrow. A large frame may locate the rotors 37 relative to the work vehicle towing the agricultural raking vehicle 26. Furthermore, each rotor 37 may include a set of sensors, as discussed below, to determine the corresponding windrow quality. In certain embodiments, parameters of each rotor 37 may be adjusted by a controller (e.g., configured to adjustment a tine height and crop delivery) and the overall ground speed may be based on the feedback from the rotors 37. In certain embodiments, the vehicle ground speed is set to an average speed corresponding to the overall windrow quality or set to the slowest speed corresponding to any one rotor's achieving a target windrow quality. Rotor rotation speed may be set in a similar manner for embodiments in which certain components of the agricultural raking vehicle 26 are mechanically coupled to the work vehicle power take off (PTO) and engine, as described below. In certain embodiments, the agricultural raking vehicle 26 is driven hydraulically, such that the rotors 37 are independently controlled.

The motor drive may be positioned underneath the rotating crown holding the rotating members 34. The raking members 34 are coupled to the rotor 37 at a top portion (e.g., top side) of the agricultural raking vehicle 26. The position of the tines 36 relative to the ground may be adjusted by raising/lowering the chassis 30 along the vertical axis 18 (e.g., by controlling the vertical position of the wheels relative to the chassis using linear actuators as an example), by rotating the raking members 34 about respective pivot axes (e.g., along the second rotation direction 22) to adjust the vertical position of the tips of the tines 36, by adjusting the vertical position of the rotor 37 (e.g., by raising or lowering the rotor 37 via actuation of an actuator), by any other suitable actuation method, or a combination thereof, in response to receiving a control signal indicative of adjusting the height of the tines 36, as discussed below. In some embodiments, the rotation angle of the tines 36 is related to the height of the tines 36 relative to the ground. Further, the tine angle may be adjusted by actuating an actuator of the tines 36 to modify how the agricultural product is delivered to the deflector to produce a windrow. The height of the tines (e.g., tine tip height from the ground) may be adjusted by moving the whole rotor 37 vertically.

In certain embodiments, the agricultural raking vehicle 26 includes an extendable arm 40 coupled to (e.g., fixed with respect to) the chassis 30 of the agricultural raking vehicle 26. The extendable arm 40 may be formed from any suitable material having acceptable tensile and yield strength, such as any suitable steel alloy, an iron-nickel alloy, iron, and so forth. The extendable arm 40 is coupled to a deflector 42 configured to receive the raked agricultural product from the raking members and to create a windrow of the agricultural product. In certain embodiments, the extendable arm 40 may extend along the lateral axis 16 (e.g., perpendicular to a direction of travel), and the extendable arm is configured to adjust the position of the deflector 42 relative to the chassis 30 along the lateral axis 16. For example, the extendable arm 40 may include a first member configured to slide within a second member of the extendable arm 40, such that the first member may extend to increase the length of the extendable arm 40, as discussed below. Furthermore, the deflector 42 may be rotatable about the vertical axis 18, such that the angle of the deflector 42 relative to the direction of travel 28 may change based on a control signal. In certain embodiments, the extendable arm may include an extendable arm actuator configured to receive the control signal to adjust the position of the deflector along the lateral axis 16, and the deflector may include a deflector actuator configured to receive the control signal to adjust an angle of the deflector.

The extendable arm 40 (e.g., the portion of the extendable arm 40 coupled to the chassis 30) may also be coupled to one or more frame members 44, such as the two illustrated frame members 44. The frame members 44 may couple to a guard member 46 positioned at a front portion of the agricultural raking vehicle 26 along the direction of travel 28. The guard member 46 may include a rigid member and a tarp configured to block certain objects from contacting the chassis 30 or the raking members 34 during performance of raking operations. In certain embodiments, an object detection sensor 48 configured to detect approaching objects may be mounted to the guard member 46. In response to detecting an object exceeding a certain size, a controller may cause the agricultural raking vehicle to stop and/or avoid the object.

The object detection sensor 48 may include an ultrasonic sensor configured to output an acoustic wave toward an object and to receive a return signal indicative of the object, an infrared sensor to employ light waves for object detection purposes, or any suitable sensor for detecting objects. The object detection sensor 48 may detect whether agricultural product is being raked. In response to agricultural product not being raked, the controller described below may cause the agricultural raking vehicle to increase in speed until the object detection sensor 48 detects agricultural product. In other embodiments, the agricultural raking vehicle may include an ultrasonic sensor positioned on a rear portion of the agricultural raking vehicle, configured to output an acoustic wave toward the windrow, and configured to receive a return signal indicative of a quality of the windrow. The rotor 37 may be raised (e.g., via corresponding actuator) in response to object detection (e.g., based on the size of the detected object) via the controller described below. The controller may be tuned to determine the difference between agricultural product (e.g., for raking purposes) and larger objects (e.g., rocks, bushes, trees, etc.) that should be avoided.

In certain embodiments, the agricultural raking system 10 includes a controller 50 communicatively coupled to certain features of the agricultural raking vehicle 26, such as the object detection sensor 48 and the motor drive 38. The controller 50 may also be configured to communicatively couple to peripheral devices, such as a portable computer (PC) and/or a mobile device (e.g., a laptop, a tablet, a smart phone), via an internet connection, for example. In certain embodiments, the controller 50 is an electronic controller having electrical circuitry configured to process data from components of the agricultural raking system 10. In the illustrated embodiment, the controller 50 includes a processor, such as the illustrated microprocessor 52, and a memory device 54. The controller 50 may also include one or more storage devices 56 and/or other suitable components. The processor 52 may be used to execute software, such as software for controlling the agricultural raking vehicle 26, actuating the motor drive 38 to drive the raking members 34 in rotation, and so forth (e.g., by using independent rotational speed of front wheels to create two torque on the frame that could be same (moving forward or backward) or different (the largest torque on the frame from left or right will change the direction of the rake)). Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors.

The memory device 54 may include a volatile memory, such as random-access memory (RAM), and/or a nonvolatile memory, such as read-only memory (ROM). The memory device 54 may store a variety of information and may be used for various purposes. For example, the memory device 54 may store processor-executable instructions (e.g., firmware or software) for the processor 52 to execute, such as instructions for controlling the agricultural raking vehicle 26. The storage device(s) 56 (e.g., nonvolatile storage) may include ROM, flash memory, a hard drive, or any other suitable optical, magnetic, or solid-state storage medium, or a combination thereof. The storage device(s) 56 may store data (e.g., field maps with corresponding objects on the field, position data, identification data, etc.), instructions (e.g., software or firmware for controlling the agricultural vehicle, etc.), and any other suitable data.

In certain embodiments, the controller 50 may be supported by the chassis 30 and/or housed within an electronics module on the chassis 30. In further embodiments, the controller 50 may be external to the agricultural raking vehicle 26 (e.g., at a remote base station), and the controller 50 may wirelessly communicate with various components of the agricultural raking vehicle 26 over any suitable communication network. In other embodiments, the controller may be positioned inside a work vehicle configured to haul the agricultural raking vehicle, as discussed below. The controller 50 may be communicatively coupled to the motor drive 38, the deflector actuator 57, the extendable arm actuator 59, the object detection sensor 48, a wheel height actuator, a rotor height actuator, and/or a raking member actuator to adjust the height of the tines 36, etc. The controller may be configured to output respect control signals to actuate the corresponding component to control the raking operations disclosed herein. To block debris from contacting the electrical components of the agricultural raking vehicle 26, such as the controller 50, the agricultural raking vehicle 26 may include a flexible shield 58 defining a circular border around the chassis 30. The raking members 34 may be positioned outside the circular border defined by the flexible shield 58. As described in more detail below, the controller 50 may adjust a speed of the motor drive 38 and a height of the tines 36 to achieve a target windrow quality, as discussed in detail below.

Figure 2:
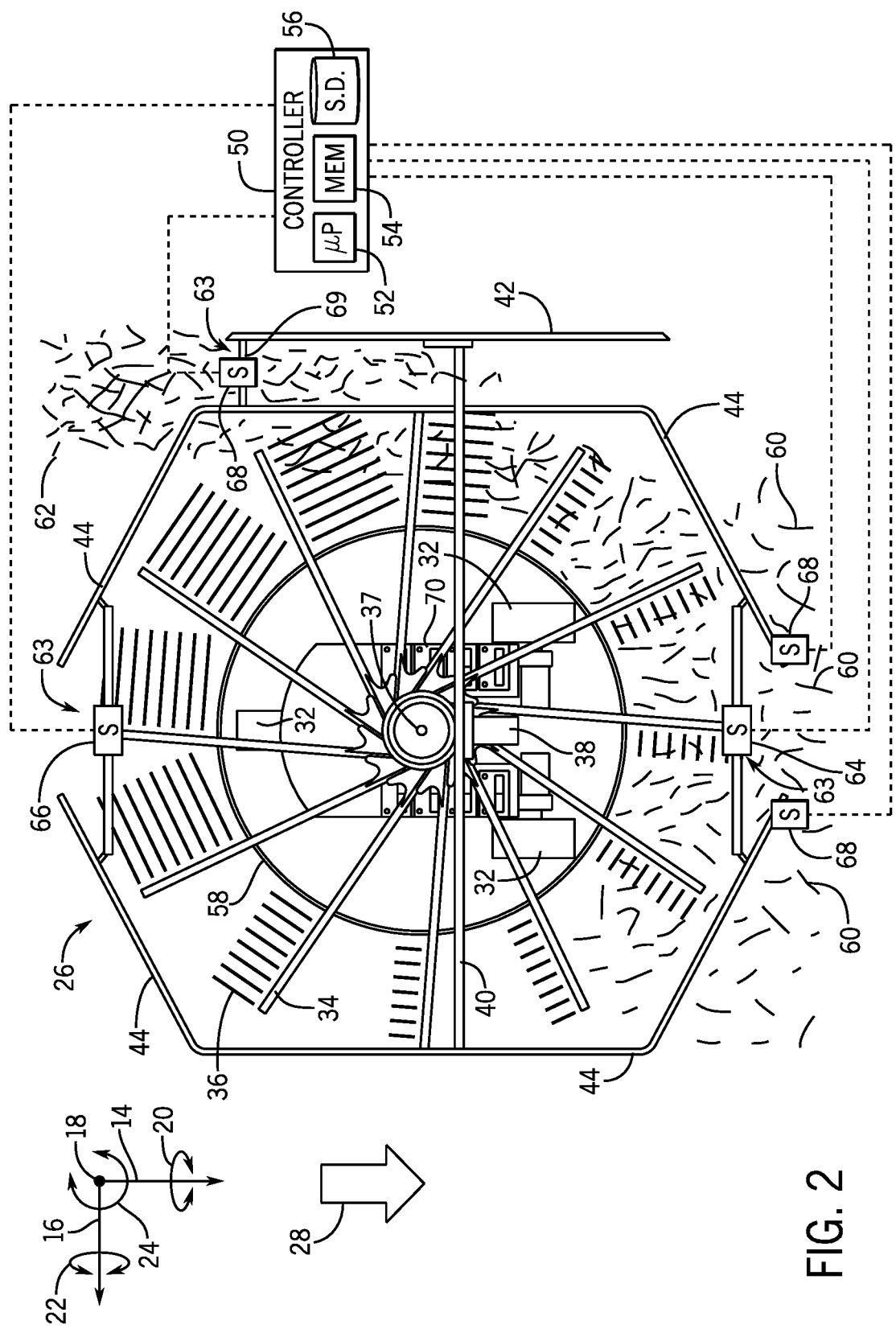
FIG. 2 is a schematic top view of the agricultural raking system of FIG. 1, in accordance with aspects of the present disclosure.

FIG. 2 is a schematic top view of the agricultural raking system 10 of FIG. 1, in accordance with aspects of the present disclosure. In the illustrated embodiment, the agricultural raking vehicle 26 travels along the direction of travel 28 toward agricultural product 60 on the field. As discussed above, the motor drive 38 may receive a control signal from the controller 50 to cause the rotor 37 of the motor drive 38 to rotate about the vertical axis 18 along third direction 24, thereby causing rotation of the raking members 34. As the raking members 34 rotate, tines 36 may engage with the agricultural product 60. For example, the tines 36 may move the agricultural product 60 toward the deflector 42, such that a portion of the agricultural product 60 engages the deflector 42. As a result, the motor drive 38, controller 50, and raking members 34 may perform improved raking operations. That is, the motor drive 38, controller 50, and raking members 34 may control rotation of the tines 36 to form a windrow 62 of the agricultural product 60.

To enhance the raking operations, in certain embodiments, the agricultural raking system 10 may include a sensor assembly 63 in addition to the controller 50. In other embodiments, the controller and sensor assembly may be part of the agricultural raking vehicle. The sensor assembly 63 may include one or more image capturing devices and/or ultrasonic devices. For example, the agricultural raking vehicle 26 may include a front camera 64 and a rear camera 66. While the image capturing devices are described in the context of a front camera and a rear camera, in further embodiments, the image capturing devices may be positioned in any suitable position with respect to the agricultural raking vehicle 26, such as on the chassis 30, fixed on a field and external to the agricultural raking vehicle 26, and so forth. The front camera 64 may be configured to receive an image or multiple images (e.g., a video) indicative of unraked agricultural product 60. The rear camera 66 may be configured to receive an image or multiple images (e.g., a video) indicative of the windrow 62 of the agricultural product 60. In certain embodiments, the front camera 64 and the rear camera 66 are communicatively coupled to the controller 50. In this manner, the controller 50 may receive data (e.g., images) from the cameras, and the controller may control operations based on the received data, as described below with respect to FIG. 13.

Moreover, the sensor assembly 63 may include one or more ultrasonic sensors 68. The agricultural raking vehicle 26 may include an ultrasonic sensor 68 positioned at the front of the agricultural raking vehicle 26. The ultrasonic sensor 68 may determine a quality of incoming agricultural product. The agricultural raking vehicle 26 may include an ultrasonic sensor 68 positioned on a rear portion of the agricultural raking vehicle 26. The ultrasonic sensor 68 may determine a quality of the windrow of agricultural product. In certain embodiments, the ultrasonic sensor 68 may include a transmitter to convert electrical signals into ultrasound and a receiver to convert returned ultrasound into electrical signals (e.g., communicated to the controller 50). In certain embodiments, the transmitter and receiver may be elements of a transceiver. In certain embodiments, the ultrasonic sensor(s) 68 may be communicatively coupled to the controller 50 and facilitate determination of a quality of the windrow 62. For example, in the illustrated embodiment, the ultrasonic sensor 68 is positioned on a bracket member 69 oriented substantially perpendicular to a rear portion of the deflector 42. The ultrasonic sensor 68 may generate a sound wave (e.g., in the ultrasonic range above 18 kHz) by turning electrical energy into sound, then upon receiving an echo (e.g., acoustic wave), turn the acoustic waves into an electrical signal, which is communicated to the controller 50. The controller 50, in turn, may determine a contour, position, size, composition, and so forth of the windrow based on the electrical signal from the ultrasonic sensor 68. Then, the controller 50 may control the motor drive 38, the extendable arm actuator 59, the deflector actuator 57, and various other components of the agricultural raking vehicle based on the windrow properties (e.g., determined windrow quality). While the sensor assembly 63 is discussed as having image capturing devices and an ultrasonic sensor 68, in further embodiments, capacitive sensors, infrared sensors, accelerometers, image sensors, or any other suitable sensors, may be used in lieu of or in addition to the image capturing devices and ultrasonic sensor, and other techniques (e.g., machine learning, artificial intelligence (AI), etc.) may be employed.

In certain embodiments, the image capturing device(s) may be communicatively coupled to a remote base station controller to allow a remote operator (e.g., user) to see the images/video captured by the image capturing device(s) to receive an indication of the environment surrounding the agricultural raking vehicle. In this manner, the operator may improve or validate the operational parameters to managing the windrow quality. In other embodiments, the image capturing devices may be positioned on flying devices (e.g., drones) communicatively coupled to the controller and/or the agricultural raking vehicle. The flying devices may be configured to fly above or around the agricultural raking vehicle to collect images/videos of the area surrounding the agricultural raking vehicle. In other embodiments, the front camera or the rear camera are omitted, such that windrow quality is based only on sensor feedback from the ultrasonic sensor(s). For example, an operator of the agricultural raking vehicle may initiate a simplified configuration of the agricultural raking vehicle that disables the cameras and enables the agricultural raking vehicle to be towed by a work vehicle, as discussed below. In such embodiments, the agricultural raking vehicle may omit an onboard engine, and crop detection sensors of the sensor assembly may adjust the rake settings as the work vehicle operates and display the settings (e.g., on a monitor of the work vehicle) to an operator as suggestions for improved settings and/or adjust the settings automatically, as discussed below.

In the illustrated embodiment, the agricultural raking vehicle 26 includes a battery assembly 70. The battery assembly 70 may include any number of electro-prismatic cells (e.g., batteries) configured to store charge. In some embodiments, the battery assembly 70 may supply an electric motor with sufficient power to move the agricultural raking vehicle through a field and perform the raking operations disclosed herein. As described in detail below, in certain embodiments, the battery assembly 70 may store charge received through one or more solar panels of the agricultural raking system 10. However, in further embodiments, the agricultural raking vehicle 26 may include an engine (e.g., diesel or gas engine), or a combination of an engine and an electric motor/battery assembly 70. In other embodiments, the engine may drive a generator to charge the battery assembly discussed below.

Figure 3:
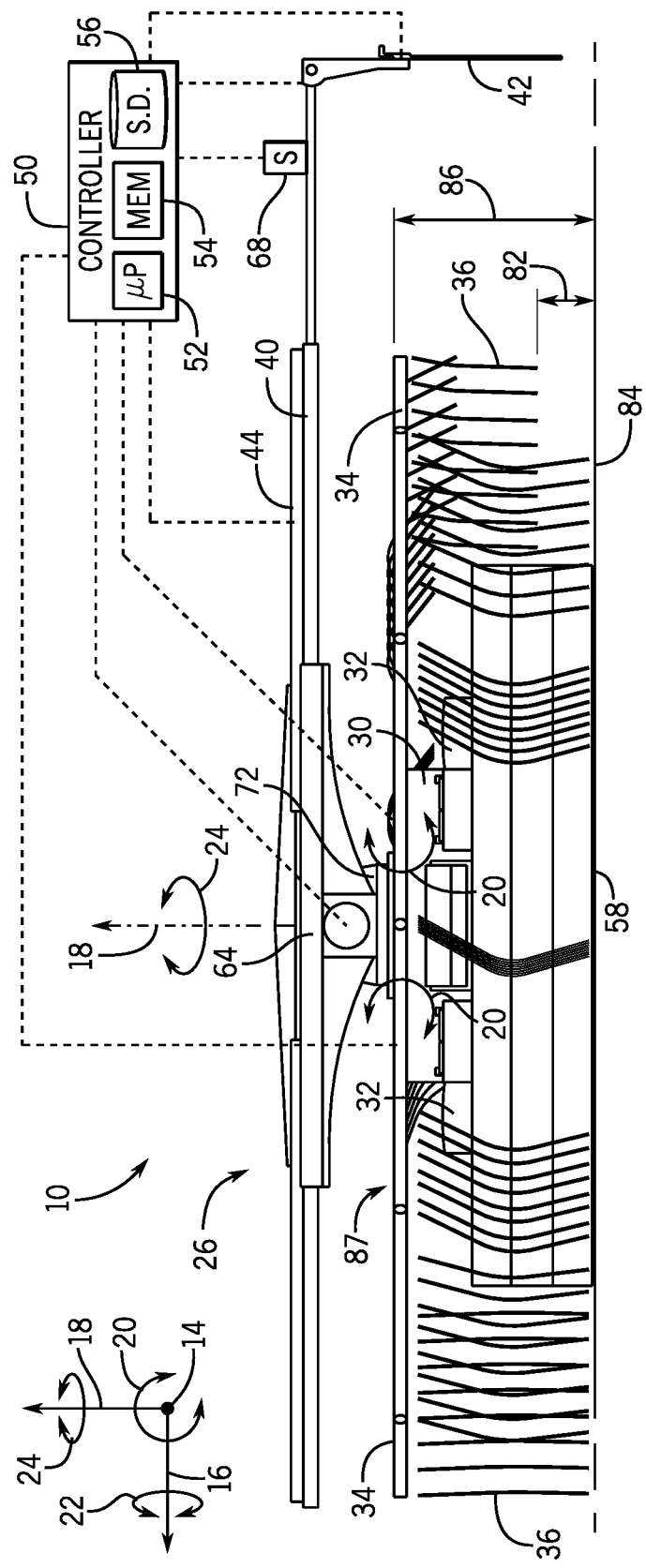
FIG. 3 is a schematic front view of the agricultural raking system of FIG. 1, in accordance with aspects of the present disclosure.

FIG. 3 is a schematic front view of the agricultural raking system 10 of FIG. 1, in accordance with aspects of the present disclosure. In the illustrated embodiment, the motor drive may receive a control signal from the controller 50 to rotate the rotor 37 about the vertical axis 18 in the third direction 24 to cause rotation of the raking members 34. Accordingly, the tines 36 may move at least a portion of the agricultural product against the deflector 42 to create a windrow of raked agricultural product. The controller 50 may actuate certain component(s) to adjust a height 82 of the tines 36 above a ground 84 and/or adjust a height 86 of the raking members 34 above the ground 84. For example, in certain embodiments, the controller 50 outputs a control signal to an actuator of a hydraulic system to raise or lower the chassis 30 thereby raising or lowering the raking members 34 to adjust the heights 82, 86. In another embodiment, the controller may send a control signal to raking member actuator to cause the raking members 34 to rotate about any suitable point in direction 20 to raise or lower the tines 36. In another embodiment, the raking member actuator may cause the raking members 34 to rotate about an axis along which the tines are oriented to raise and lower the tines 36.

The raking members 34 may be actuated by a roller on a short arm at the inward end of raking member 34. The roller member 34 may engage a corresponding circular cam 87 (e.g., about axis 24). The cam-roller-arm arrangement may define the orientation of tines 36, such that the tines 36 gather crop and direct it toward the deflector. The cam 87 may be mounted to the chassis 30. Rotating the cam 87 (e.g., via the controller 50) relative to the frame about axis 24, 16, and/or 14 may change the "timing" at which agricultural product engages with the deflector occurs. In certain embodiments, moving the cam 87 vertically relative to the rotor 37 adjusts the heights 82, 86. In this manner, the cyclic function the tine members 34 may be coordinated.

The controller may adjust the raking member actuators to rotate the tines to improve the windrow quality by scooping and/or fluffing the agricultural product. For example, if the agricultural product has been rained on, it may be compressed into the stubble leftover from cutting, such that a certain small tine angle (e.g., angle relative to the normal) of between zero and thirty degrees may improve the amount of agricultural product able to be raked, and therefore improve the windrow quality. Alternatively, if the agricultural product is light, the small tine angle may throw the agricultural upward into the framework of the agricultural raking vehicle to decrease the windrow quality. In further embodiments, the height 82, 86 may be adjusted via actuation of any suitable device or component of the agricultural raking vehicle 26, such as actuator 72. The manner in which the agricultural product is forwarded from the tines 36 toward the deflector may be based on the height 82 and/or 86. Adjusting the height during raking operations may adjust the windrow quality, as discussed below. In certain embodiments, the controller 50 may send a respective signal to the raking member actuators corresponding to the raking members 34 to independently rotate the raking members 34. In certain embodiments, during performance of raking operations, the flexible shield 58 may substantially block agricultural product from contacting the chassis 30, the electronics, the wheels 32, or a combination thereof.

Figure 4:
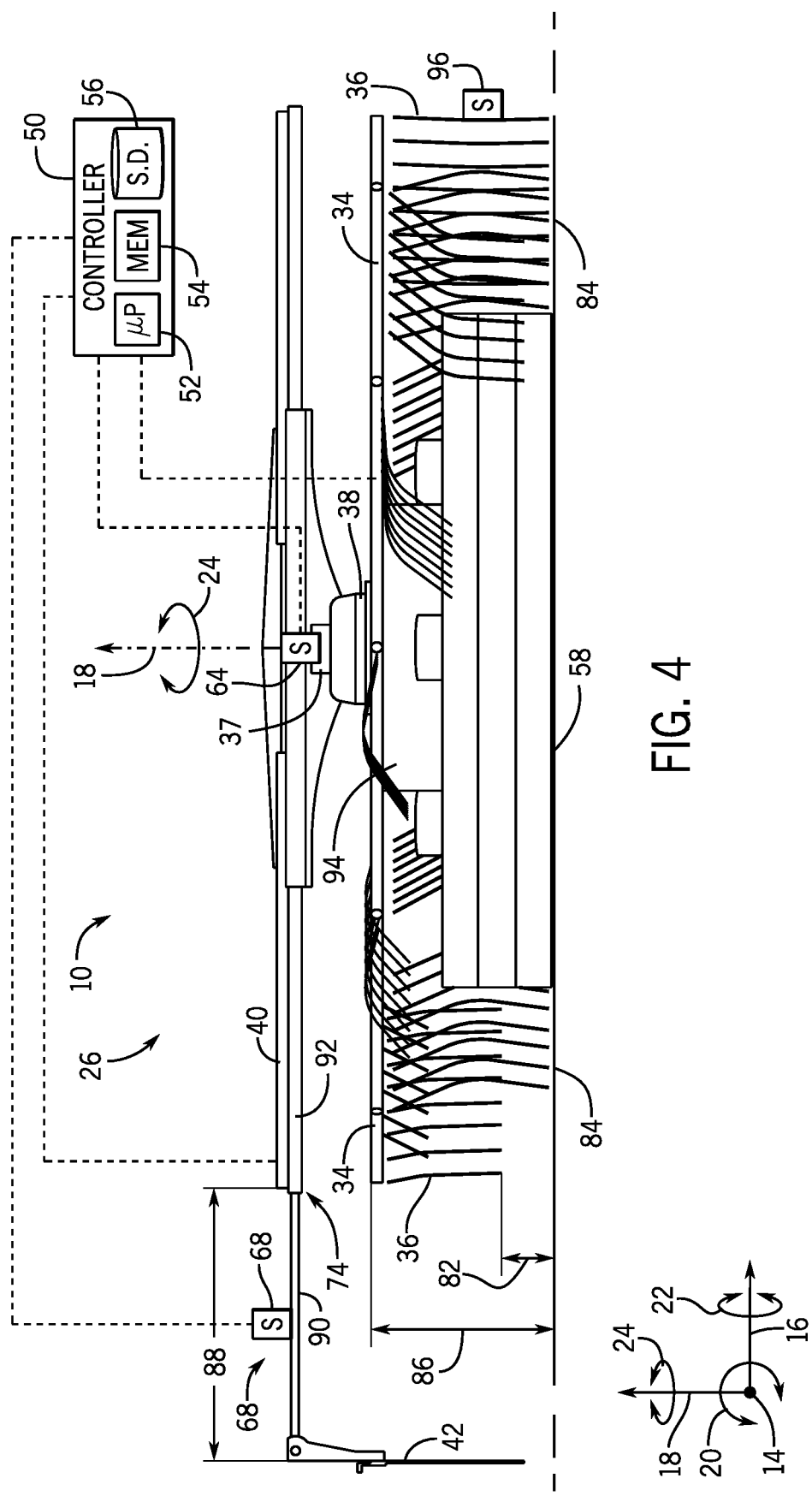
FIG. 4 is a schematic rear view of the agricultural raking system of FIG. 1, in which an agricultural raking vehicle includes a flexible shield, in accordance with aspects of the present disclosure.
Figure 5:
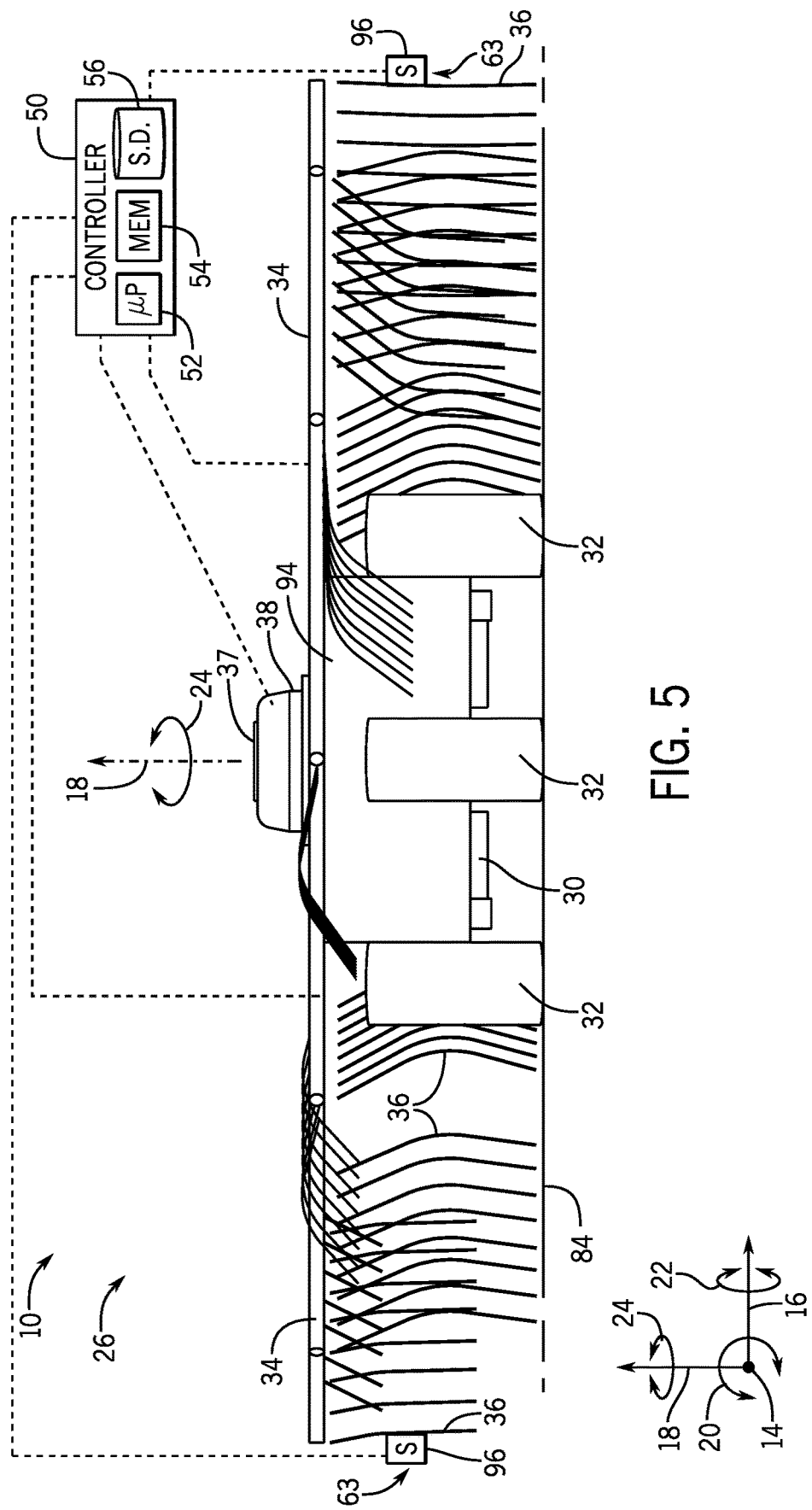
FIG. 5 is a schematic rear view of the agricultural raking system of FIG. 1, in which the flexible shield of FIG. 4 is omitted, in accordance with aspects of the present disclosure.

FIG. 4 is a schematic rear view of the agricultural raking system 10 of FIG. 1, in which the agricultural raking vehicle 26 includes the flexible shield 58, in accordance with aspects of the present disclosure. FIG. 5 is a schematic rear view of the agricultural raking system 10 of FIG. 1, in which the flexible shield 58 of FIG. 4 is omitted, in accordance with aspects of the present disclosure. Indeed, certain features are omitted in FIG. 5 to facilitate illustration of other features that would otherwise be hidden. To facilitate discussion, FIGS. 4 and 5 are discussed together. As mentioned above, the controller 50 may output a control signal to an arm actuator 74 (e.g., a pneumatic device, linear actuator, or electromagnetic actuator) to adjust an extension length 88 of the extendable arm 40. In certain embodiments, the extendable arm includes an inner arm 90 and an outer arm 92, and the inner arm 90 is movably coupled to the outer arm 92. For example, the inner arm 90 may be configured to slide along the lateral axis 16 to adjust the extension length 88. In some embodiments, the controller 50 may be positioned inside a controller box 94 configured to block debris from the field on which the agricultural raking vehicle 26 may operate from contacting the controller. The chassis 30 may support the controller box 94. In further embodiments, the controller box 94 may be positioned on top of the rotor 37.

The sensor assembly 63 may include one or more tine sensors 96 (e.g., piezoelectric sensor). In certain embodiments, the tines sensors 96 may be positioned on one or more of the tines 36 and configured to output a signal indicative of pressure, acceleration, strain, force, or any combination thereof, on the tines 36. In certain embodiments, at least one tine sensor includes a piezoelectric sensor configured to convert a measured parameter (e.g., measured pressure, acceleration, strain, force, or any combination thereof) into an electrical charge indicative of the measured parameter and communicate the measured parameter to the controller 50. In certain embodiments, the tine sensors 96 may measure a bending force on two tines positioned on opposite lateral sides of the agricultural raking vehicle. The controller may be configured to receive signals indicative of bending forces from the two tine sensors and to detect an excessive bending force in response to either bending force exceeding a threshold value. In certain embodiments, a bending force that is excessive may serve as an indication that the tines 36 are in contact with the ground 84. The controller instructs the actuator(s) to rise the tines 36 in response to detection of the excessive bending force.

Figure 7:
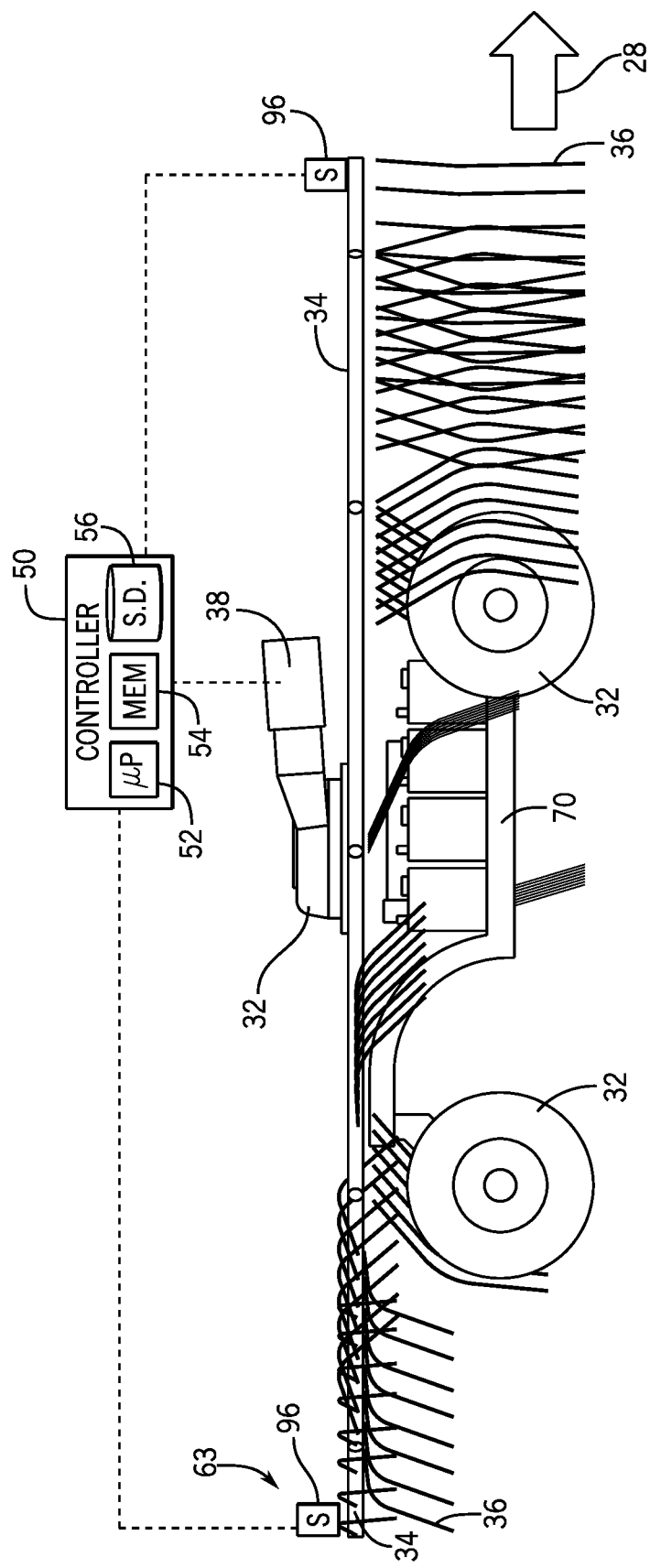
FIG. 7 is a schematic side view of the agricultural raking system of FIG. 1, in which the flexible shield of FIG. 4 is omitted, in accordance with aspects of the present disclosure.

FIG. 6 is a schematic side view of the agricultural raking system 10 of FIG. 1, in which the agricultural raking vehicle 26 includes the flexible shield 58, in accordance with aspects of the present disclosure. FIG. 7 is a schematic side view of the agricultural raking system 10 of FIG. 1, in which the flexible shield 58 is omitted, in accordance with aspects of the present disclosure. To facilitate discussion, FIGS. 6 and 7 are discussed together. In the illustrated embodiment, the agricultural raking vehicle 26 includes the battery assembly 70. As previously discussed, the battery assembly 70 may include any number of electro-prismatic cells (e.g., batteries) configured to store charge. In some embodiments, the battery assembly 70 may supply an electric motor with sufficient power to move the agricultural raking vehicle through a field and perform the raking operations disclosed herein. As described in detail below, in certain embodiments, the battery assembly 70 may store charge received through one or more solar panels of the agricultural raking system 10. However, in further embodiments, the agricultural raking vehicle 26 may include an engine (e.g., diesel or gas engine), or a combination of an engine and an electric motor/battery assembly 70.

Figure 8:
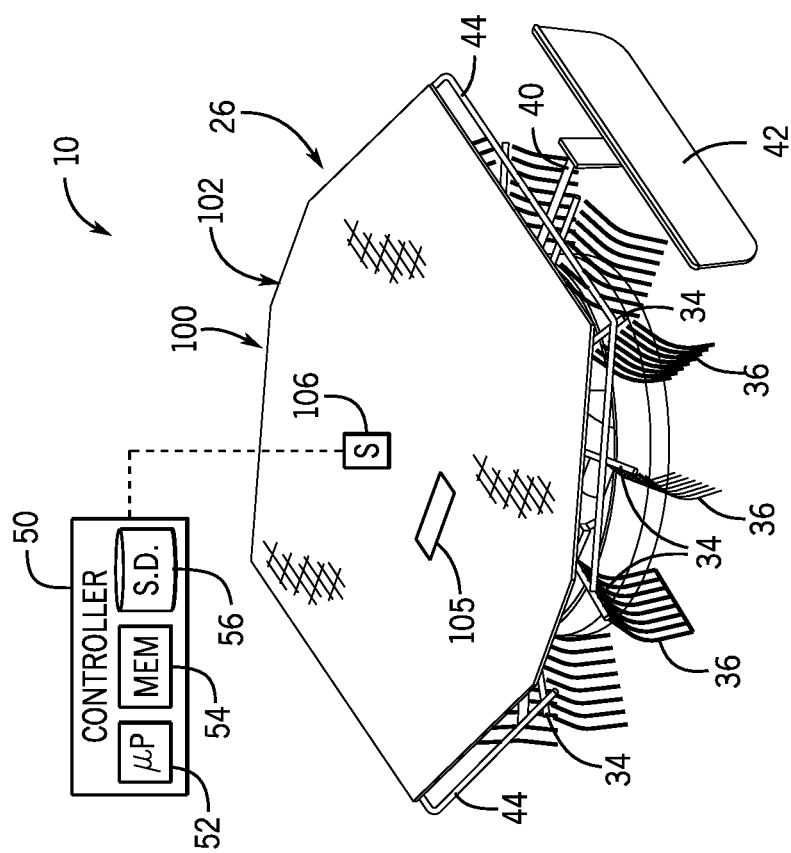
FIG. 8 is a schematic perspective view of an embodiment of an agricultural raking vehicle including a flat solar panel, in accordance with aspects of the present disclosure.
Figure 9:
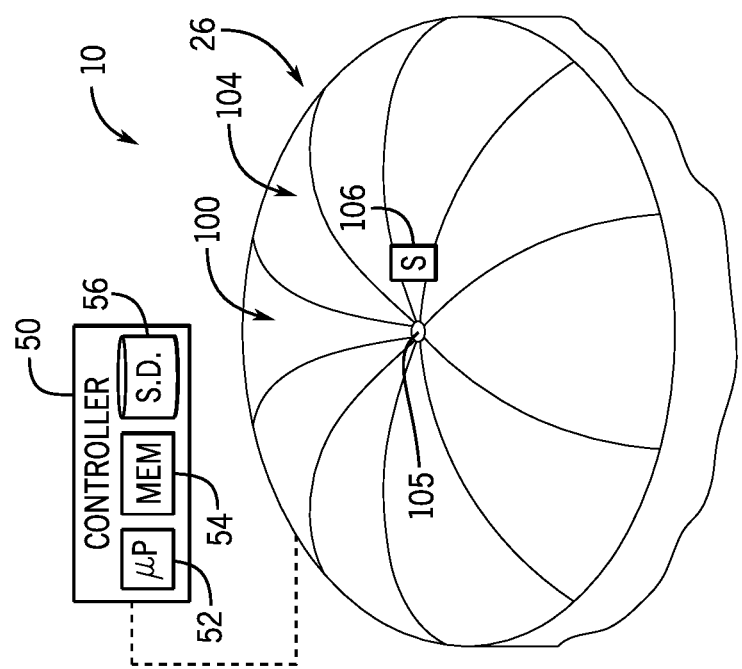
FIG. 9 is a schematic perspective view of an embodiment of an agricultural raking vehicle including a domed solar panel, in accordance with aspects of the present disclosure.

FIGS. 8 and 9 are schematic perspective views of respective embodiments of an agricultural raking vehicle 26 including a solar panel 100, in accordance with aspects of the present disclosure. The agricultural raking vehicle 26 of FIG. 8 includes a substantially planar solar panel 102, and the agricultural raking vehicle 26 of FIG. 9 includes a dome-shaped solar panel 104. The solar panel 100 may include any suitable number of photovoltaic cells configured to convert light into power. The solar panel 100 may be electrically coupled to any suitable power storage device, such as the battery assembly.

In some embodiments, the solar panel 100 is positioned at a top portion of the agricultural raking vehicle 26 and coupled to one or more frame members 44. By being positioned at the top portion of the agricultural raking vehicle 26 and oriented toward the sky, sun exposure of the solar panel 100 may be enhanced. The agricultural raking vehicle 26 may include any number of solar panels 100, having any suitable size and shape.

In certain embodiments, the agricultural raking vehicle 26 is charged during operation of the agricultural raking vehicle 26. For example, the agricultural raking vehicle 26 may perform raking operations during hours of the day while the sun is out, and thus may charge the battery and/or power the electric motor. In addition, the agricultural raking vehicle 26 may be charged while operating on a field. In other embodiments, the agricultural raking vehicle may be inoperable during hours of high sun exposure to receive charge via the solar panel (e.g., daytime) and operate during hours of low sun exposure (e.g., nighttime).

An actuating device 105 may be coupled to the solar panel, and the actuating device 105 and a photon sensor 106 may each be communicatively coupled to the controller 50. The actuating device 105 may be positioned on the top portion of the agricultural raking vehicle 26 and may adjust a position/orientation of the solar panel 100 in response to receiving a control signal from the controller 50. The controller may control the position/orientation of the solar panel based on data from the photon sensor 106. For example, the photon sensor 106 may detect a higher amount of sunlight from a particular angle of incidence. The controller 50 may receive the data from the photon sensor 106 and actuate the actuating device 105 to orient the solar panel 100 to be substantially perpendicular to the angle of incidence to improve operation of the solar panel 100. While FIGS. 8 and 9 are discussed in the context of a photon sensor 106, further embodiments may additionally or alternatively employ a thermal sensor, a light sensor, or any suitable device for detecting sunlight. In further embodiments, the sensors or actuating device 105 may be omitted.

Figure 10:
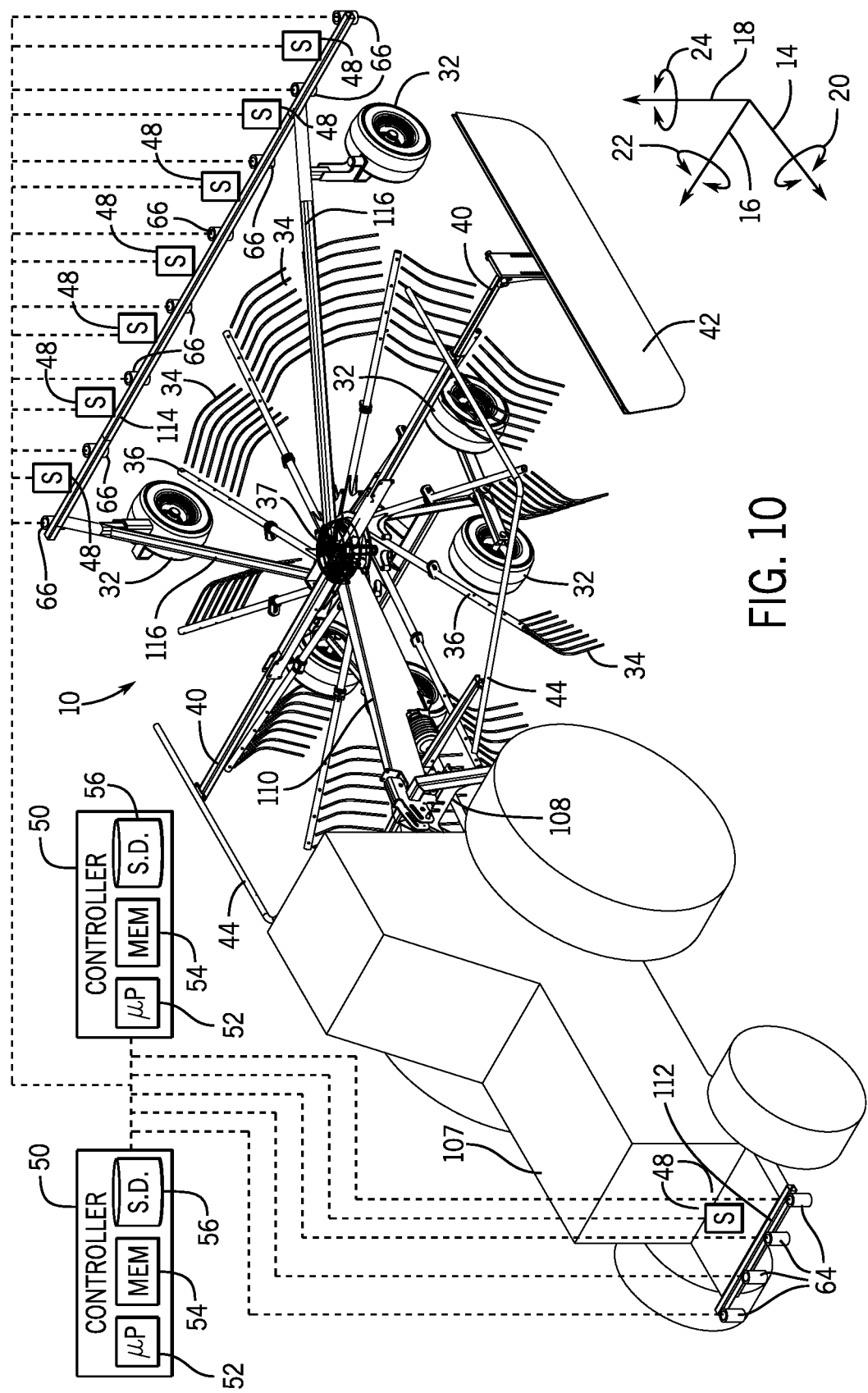
FIG. 10 is a schematic perspective view of an embodiment of a work vehicle coupled to the agricultural raking vehicle of FIG. 4, in accordance with aspects of the present disclosure.

FIG. 10 is a schematic perspective view of an embodiment of a work vehicle 107 coupled to the agricultural raking vehicle, in accordance with aspects of the present disclosure. The work vehicle 107 may include any suitable type of work vehicle, such as a tractor, an all-terrain vehicle (ATV), a truck, a backhoe dig, and the like. In some embodiments, the work vehicle 107 is controlled by a user, while in other embodiments, the work vehicle may be completely or partially autonomous (e.g., controlled by a controller). The work vehicle 107 may mechanically couple to the agricultural raking vehicle 26. For example, the work vehicle 107 may include a connecting member 108, such as a hitch, a pin, a locking device, another suitable device for removably coupling the agricultural raking vehicle 26 to the work vehicle 107, or a combination thereof. A cover 110 may block debris from contacting the connecting member 108. In the illustrated embodiment, the cover 110 extends the length of the connecting member 108, but in further embodiments, the cover may cover a portion of the connecting member and/or the cover may be omitted from the connecting member.

In some embodiments, the work vehicle 107 and agricultural raking vehicle 26 include respective controllers 50, and the work vehicle controller may communicatively couple with the agricultural raking vehicle controller. For example, in response to receiving an indication of mechanically coupling to the work vehicle 107, the controller 50 of the agricultural raking vehicle 26 may control a transmission of the agricultural raking vehicle 26, such that the agricultural raking vehicle 26 is maintained in neutral to enable the agricultural raking vehicle 26 to be moved (e.g., towed) by the work vehicle 107. In this manner, the wheels 32 may be passively driven in rotation by the work vehicle 107. In further embodiments, one controller may control both the work vehicle and the agricultural raking vehicle.

In certain embodiments, the front camera(s) 64, the rear camera(s) 66, and the ultrasonic sensors 68 are communicatively coupled to the controller(s) 50. In the illustrated embodiment, and as described below with respect to FIG. 11, the front camera(s) 64 are positioned on the front of the work vehicle 107. The front camera(s) 64 may be spaced apart from one another in any suitable configuration. In addition, the front camera(s) 64 may be mounted on a front lateral member 112 at any suitable position. In the illustrated embodiment, the front lateral member 112 extends the width of the body of the work vehicle 107 and is coupled to the front of the work vehicle 107. While in the illustrated embodiment, four front cameras 64 are mounted to the front of the work vehicle 107, in further embodiments, any suitable number of front cameras may be mounted to the front of the work vehicle 107. In some embodiments, the object detection sensor 48 is mounted to the work vehicle 107, and the object detection sensor 48 may be mechanically coupled to the front lateral member 112. In some embodiments, a first subset of the object detection sensors 48 (e.g., positioned on the rear portion of the agricultural raking vehicle 26) may be used to detect missed crop, and a second subset of the object detection sensors 48 (e.g., positioned on the rear portion of the agricultural raking vehicle 26) may be used to determine the quality of the raked agricultural product. Furthermore, in the illustrated embodiment, the rear camera(s) 66 are positioned on a rear lateral member 114. While in the illustrated embodiment, eight rear cameras 66 are mounted to the rear lateral member 114, in further embodiments, any suitable number of rear cameras may be positioned in any suitable spacing arrangement along the rear lateral member.

The rear lateral member 114 may be oriented substantially along the lateral axis 16. In the illustrated embodiment, the rear lateral member 114 is rigidly coupled to two arm members 116. While in the illustrated embodiment two arm members 116 extend from the extendable arm 40, in further embodiments, the agricultural raking vehicle may include any suitable number of arm members (e.g., one, three, four, six, etc.) coupled to any suitable component (e.g., the chassis, a cover of the motor, etc.) of the agricultural raking vehicle. In some embodiments, when the work vehicle 107 is manually controlled, the agricultural raking vehicle 26 may continue to operate automatically (e.g., adjusting the height of the tines, an angular speed of the motor device, etc.) or semi-automatically. While in the illustrated embodiment two wheels 32 are mechanically coupled to the arm members 116, in further embodiments, the wheels may be instead of additionally be coupled to the rear lateral member. In this manner, the rear object detection sensors 48 may be maintained at a more uniform height relative to the ground and crop to improve the determination of windrow quality. In certain embodiments, a propulsion system may be omitted from the agricultural raking vehicle 26 when the agricultural raking vehicle 26 is towed by a work vehicle. In certain embodiments, the agricultural raking vehicle 26 may provide power through a power take off (PTO) shaft which may be mechanically coupled to an engine of the work vehicle 107. In certain embodiments, the PTO drive configuration may replace or be used in parallel with the motor drive 38. In certain embodiments, the controller 50 may control the work vehicle engine speed, which may control the rotor speed (e.g., by a mechanical connection). In some embodiments, the work vehicle provides hydraulic and/or electrical power to some of the actuators described herein. In this manner, the controller may output control signals to the work vehicle 107 to adjust the operating parameters described herein. In certain embodiments, the GPS data of the position of the windrow (e.g., precision farming map), may facilitate the work vehicle centering the windrow in between the wheels to avoid rolling over the crop and increase crop losses.

In some embodiments, the front camera or the rear camera are omitted from the agricultural raking vehicle 26, such that windrow quality is based only on sensor feedback from the ultrasonic sensor(s) 68 associated with the work vehicle 107. For example, an operator of the agricultural raking vehicle 26 may initiate a simplified configuration of the agricultural raking vehicle that disables the cameras and enables the agricultural raking vehicle 26 to be towed by a work vehicle 107. An onboard engine may be omitted from the agricultural raking vehicle 26, and crop detection sensors (e.g., ultrasonic sensor(s) 68) of the sensor assembly 63 may adjust the operational parameters as the work vehicle operates and a display may present the settings to an operator as suggestions for improved settings and/or adjust the settings automatically.

Figure 11:
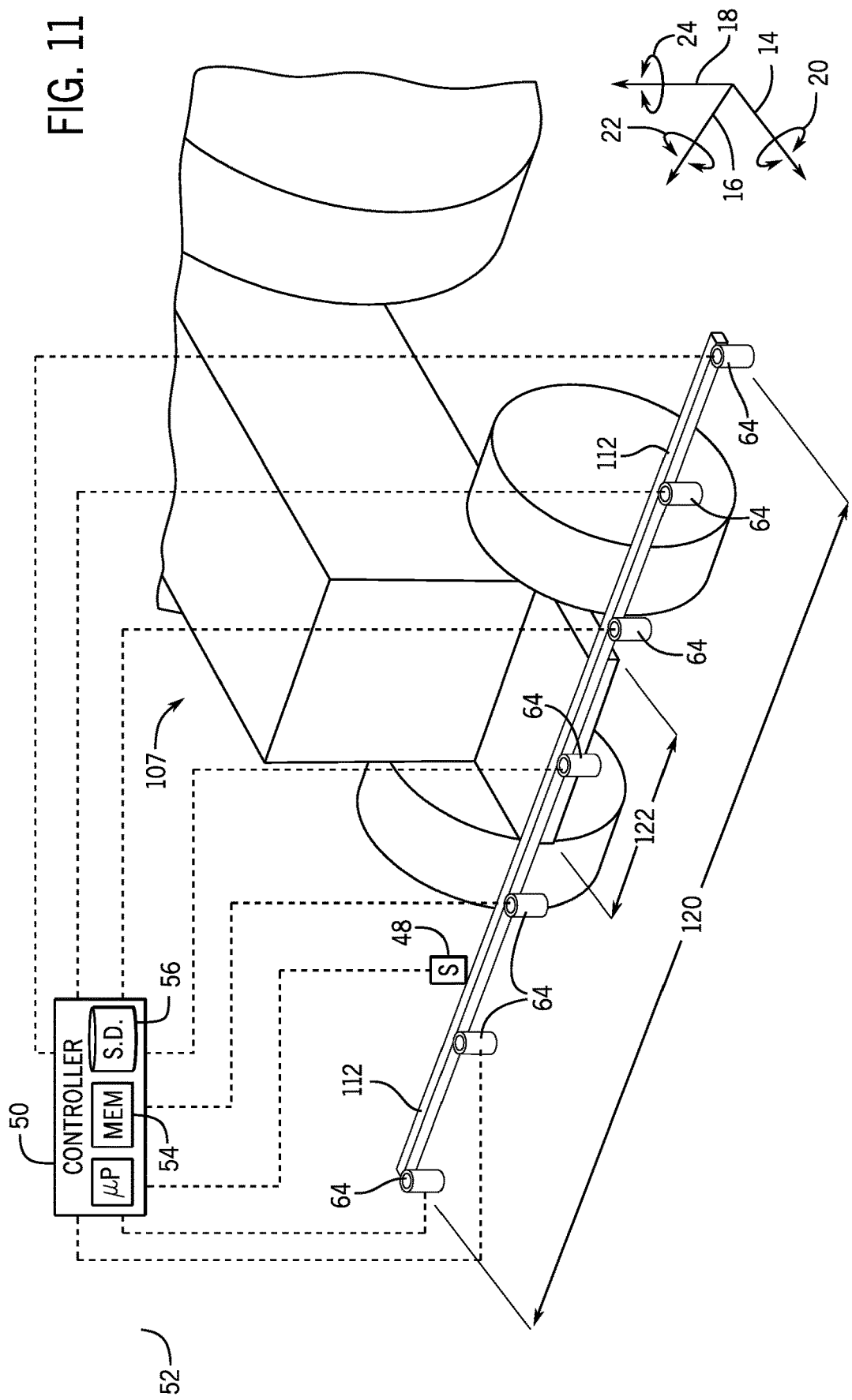
FIG. 11 is a schematic perspective view of a front portion of the work vehicle of FIG. 10, in accordance with aspects of the present disclosure.

FIG. 11 is a schematic perspective view of the front portion of the work vehicle 107 of FIG. 10, in accordance with aspects of the present disclosure. The work vehicle 107 may be configured to couple to and tow the agricultural raking vehicle 26 through the field. In the illustrated embodiment, the front lateral member 112 is coupled to the work vehicle, and the front lateral member 112 has a length 120 exceeding a width 122 of the work vehicle 107. In the illustrated embodiment, six front cameras 64 and an ultrasonic sensor 68 are coupled to the front lateral member 112, and the six front cameras 64 are configured to capture respective images or videos of the agricultural product in front of the work vehicle/agricultural raking vehicle. In addition, the object detection sensor 48 may be coupled to the front lateral member 112 and configured to detect approaching objects. As discussed above, the front cameras 64 and the object detection sensor(s) 48 may be communicatively coupled to the controller 50. In some embodiments, control may be based on the sensor signals from the ultrasonic sensors 68 (e.g., front and rear), and the cameras may be used to visually verify quality of the windrow (e.g., by an operator).

Figure 12:
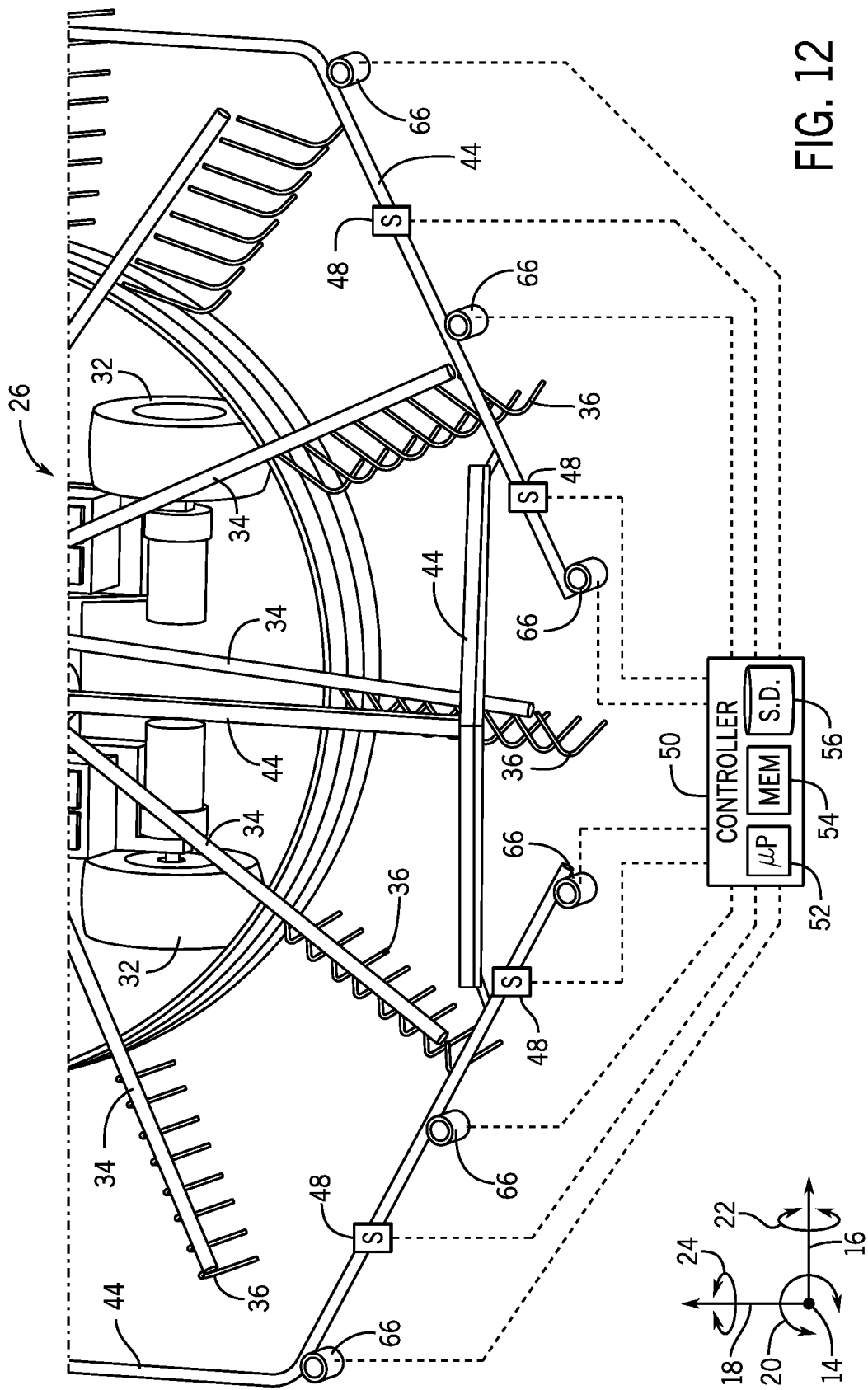
FIG. 12 is a schematic top view of an embodiment of a front portion of the agricultural raking vehicle of FIG. 4 not being towed, in accordance with aspects of the present disclosure.

FIG. 12 is a schematic top view of an embodiment of a front portion of the agricultural raking vehicle 26 of FIG. 4 not being towed, in accordance with aspects of the present disclosure. In the illustrated embodiment, the agricultural raking vehicle 26 includes four frame members 44. In further embodiments, the agricultural raking vehicle may include any suitable number of frame members. In the illustrated embodiment, three rear cameras 66 are coupled to each of the rear-most frame members to capture images of the windrow formed by the deflector as agricultural product engages with the deflector. While the illustrated embodiment includes six rear cameras 66 positioned on the rear-most frame members 44, in further embodiments, any suitable number of rear cameras may be positioned on any suitable location associated with the agricultural raking vehicle or work vehicle. In other embodiments, ultrasonic sensors 68 (instead of or in addition to cameras) may be employed to determine the windrow quality. As mentioned above, in some embodiments, a first subset of the object detection sensors 48 (e.g., positioned on the rear portion of the agricultural raking vehicle 26) may be used to detect missed crop, and a second subset of the object detection sensors 48 (e.g., positioned on the rear portion of the agricultural raking vehicle 26) may be used to determine the quality of the raked agricultural product. In some embodiments, the first subset of the object detection sensors 48 may be positioned rearward the agricultural raking vehicle 26, and the second subset of the object detection sensors 48 may be positioned rearward the deflector.

Figure 13:
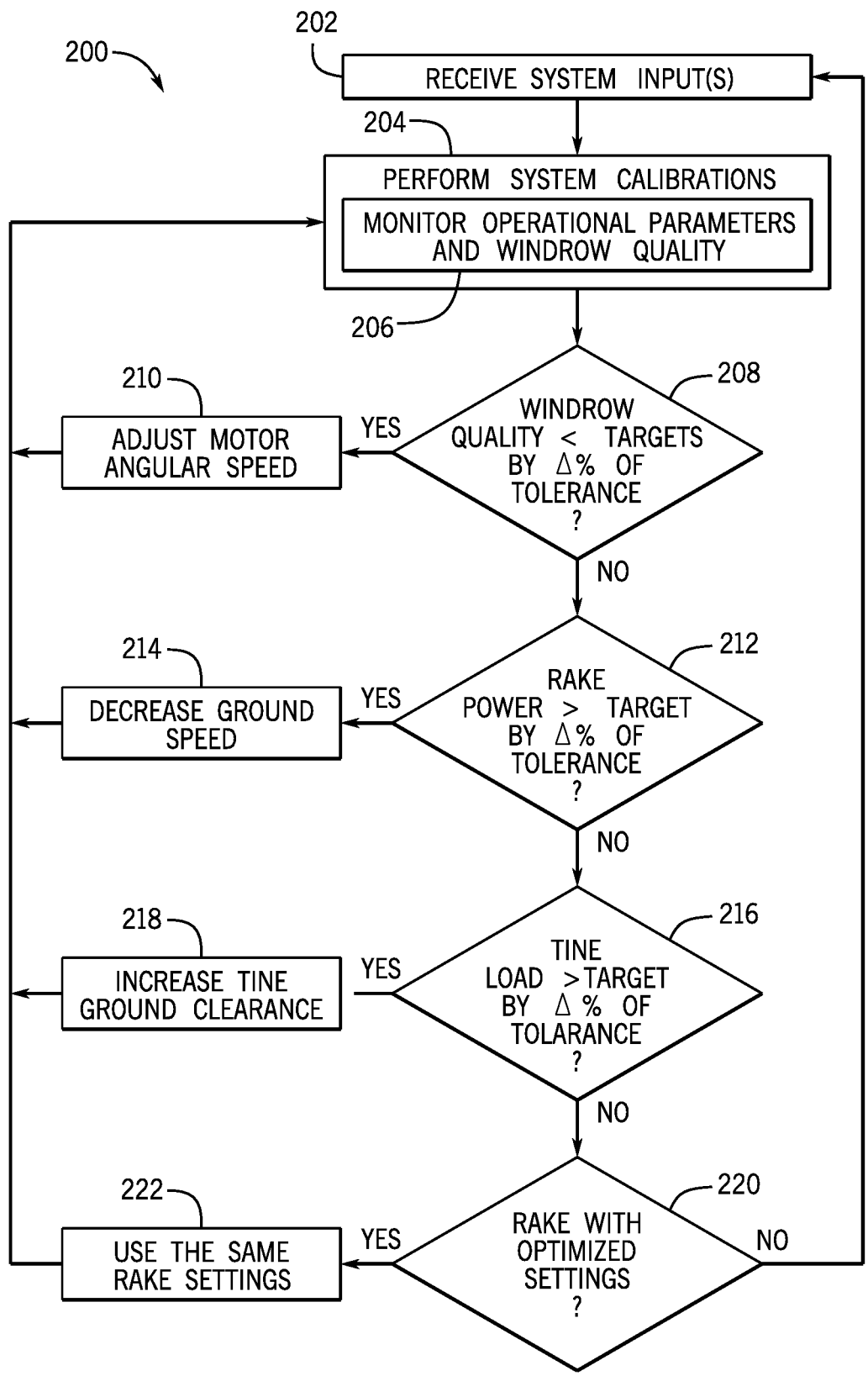
FIG. 13 is a flow diagram of an embodiment of a process for adjusting operational parameters of a work vehicle and/or an agricultural raking vehicle, in accordance with aspects of the present disclosure.

FIG. 13 is a flow diagram of an embodiment of a process 200 for adjusting operational parameters of a work vehicle and/or an agricultural raking vehicle, in accordance with aspects of the present disclosure. The process 200, which may be performed by a suitable controller, facilitates autonomously updating operating parameters (e.g., agricultural raking vehicle ground speed, work vehicle ground speed, height of the tines, orientation of tines, deflector position, rotation speed of the motor drive driving rotation of the raking members, etc.) to improve or maintain windrow quality. Although the following process 200 includes several operations that may be performed, the process 200 may be performed in a variety of suitable orders (e.g., the order that the operations are discussed, or any other suitable order). At least one of the operations of the process 200 may be omitted. Further, all the operations of the process 200 may be performed by the controller of the agricultural raking vehicle, the controller of the agricultural vehicle, a base station controller, or a combination thereof.

The process 200 includes receiving (process block 202) system inputs. The system inputs may include inputs specifying aspects of the agricultural raking vehicle and/or work vehicle. While the discussion below focuses on system inputs for the agricultural raking vehicle, the system inputs may alternatively or additionally correspond to inputs for the work vehicle (e.g., that may be hauling the agricultural raking vehicle, as discussed above with respect to FIG. 10). With this in mind, the system inputs may include a length of the raking members 34 (e.g., along a radial direction from the rotor), whether each raking member has double sided tines 36 (e.g., multiple tines extending radially outward from the raking member 34), a size of the wheels of the agricultural raking vehicle, the position of the camera(s) and object detection sensors, other suitable system inputs, or a combination thereof. In certain embodiments, the system inputs may include a map of a field on which the agricultural raking vehicle may operate. For example, the field map may include locations of objects within the field, identification data for the objects, field boundary data, and so forth. In some embodiments, the field map includes a reference system that may correspond to a reference system of a global positioning system (GPS) of the agricultural raking vehicle. In some embodiments, sensors coupled to the work vehicle and/or to the agricultural raking vehicle may be used to collect data, which the controller may use to generate a map of the field. In other embodiments, the most recent version of the field map may be imported into the controller. The map may include data indicative of previous positions of windrows after mowing (if not tedded) prior to raking to assist navigation and the position of the new windows after raking, which may be used by a baler or a forage harvester.

In certain embodiments, the system inputs may be associated with certain versions or models of agricultural raking vehicles (and/or work vehicles), such that receiving an indication of the model of agricultural raking vehicle (and/or work vehicle) causes the controller to receive (process block 202) the system inputs corresponding to the selected model. Receiving (process block 202) the system inputs may include loading the system inputs from a memory device, such as the memory devices discussed above. The system inputs may also include an indication of a maximum power output for the motor drive controlling rotation of the raking members, an indication of a maximum power of an engine/motor driving motion of the agricultural raking vehicle, and/or an indication of a maximum power available from the work vehicle.

Furthermore, the system inputs may include an indication of a target windrow quality. The target windrow quality may include an indication of a target size of the windrow (e.g., a width of base, pile height, cross-sectional area, volume per length, cross-sectional area along the length of the windrow, etc.), a target shape of the length of the windrow (e.g., straight trail of agricultural product, veering line of agricultural product, zig-zag trail of agricultural product, etc.), a target density of the agricultural product in the windrow, a target distribution of agricultural product, another suitable target parameter providing an indication of windrow quality, or a combination thereof. In some embodiments, windrow shape may also be analyzed (for rake setting optimization purpose) in case of multiple ultrasonic sensors on top of the windrow. The system inputs may include percent tolerances for other system inputs. For example, the system inputs may include a target windrow height to 0.3 meters from the ground with a 10 percent tolerance, such that the windrow height is deemed appropriate if the windrow height is measured to be between 0.33 and 0.27 meters from the ground. In some embodiments, the system inputs correspond to values output by sensors (e.g., cameras, proximity sensors (LIDAR), thermometers, barometers, infrared sensors, etc.) of the agricultural raking vehicle.

In some embodiments, the system inputs are manually input (e.g., into a graphical user interface (GUI) generated by the controller on a display communicatively coupled to the controller) by a user or worker. The GUI may include any number of graphical objects (e.g., text boxes, tables, fields, etc.) to receive input of any suitable system inputs. For example, the GUI may include a table with table fields corresponding to the system inputs indicative of the windrow quality, and the table fields may receive entries of values corresponding to the table fields. In some embodiments, certain system inputs, such as the length of the raking members, may be fixed for the duration of the operation of the agricultural raking vehicle. The table may also receive an indication of suitable tolerances. In some embodiments, not all system inputs correspond to target values of operational parameters.

The process includes performing (process block 204) system calibrations to verify the agricultural raking vehicle is adequately operating within the field. Performing (process block 204) the system calibration may include operating the agricultural raking vehicle based on the received (process block 202) system inputs. For example, the controller may initiate operation of the agricultural raking vehicle based on the system inputs by causing the agricultural raking vehicle to begin raking a field. In some embodiments, performing (process block 204) the system calibrations includes verifying operations of the agricultural raking vehicle, verifying work vehicle characteristics, verifying responses to rake controls, and so forth. In some embodiments, the controller may receive inputs from an operator, such that the operator may save the settings for future use. In some embodiments, the controller may provide the operator with prompts for downloading selected settings from the company or from a library of raking settings (e.g., from the internet) for similar rakes of other users. The operator may also send the settings to the company for verifications (or recommendations). The operator may ask load previous settings of previous raking operations for faster and improved calibration and verification.

Performing (process block 204) the system calibration may include manually or automatically monitoring (process block 206) operational parameters, such as the angular speed of the motor driving the raking members in rotation, the height of the tines above the ground, the engine power output, the ground speed of the agricultural raking vehicle, and so forth. In certain embodiments, operational parameters are received via sensor feedback. The windrow quality may be determined based on the images captured by the ultrasonic sensors, the camera(s), and/or data from the object detection sensor(s). In some embodiments, image analysis techniques are used to determine the windrow quality. The controller may receive an indication of the operational parameters of the raking operation according to a fixed schedule (e.g., every two, five, ten, twenty, or thirty seconds, or any other suitable synchronous or asynchronous schedule) and may determine whether the operational parameters are within the tolerance. For example, the system inputs may include an indication of a target angular speed of that the motor drive/raking members, however, the controller may determine that the motor drive/raking members are not rotating. Accordingly, this discrepancy may indicate that either the sensor used for determining the angular speed is not performing as expected, the system inputs were not received by the controller, the motor is not running, or any other diagnosis.

The flow diagram includes determining (decision block 208) whether the windrow quality is more than the percent tolerance different than a target windrow quality. Determining (decision block 208) whether the windrow quality is more than the percent tolerance different than a target windrow quality may include comparing a measured windrow quality (e.g., the windrow quality determined based on feedback from the ultrasonic sensors, the cameras, and/or object detection sensors to a target windrow quality. In other embodiments, the controller may determine whether the windrow quality is above and upper threshold value indicative of target windrow quality or below a lower threshold value indicative of target windrow quality. In response to determining that the windrow quality is more than the percent tolerance different than the target windrow quality, the controller may adjust (process block 210) the angular speed of the motor that drives the raking members. Adjusting (process block 210) may include increasing the angular speed of the raking members by controlling the motor to improve the windrow quality (e.g., to increase the density of the windrow). In addition, adjusting (process block 210) may include decreasing the angular speed of the raking members by controlling the motor to improve the windrow quality (e.g., to decrease the density of the windrow). As discussed below, the controller may control the vehicle speed and/or tine height above the ground based on the windrow quality.

In response to determining (decision block 208) that the windrow quality is more than the percent tolerance different than the target windrow quality, a determination is made (decision block 212) regarding whether the power output of the engine/motor (or motor drive) of the work vehicle (e.g., as determined by the sensor assembly) is greater than a target power output value, which may be received as a system input. In other embodiments, the controller may determine target speed based on agricultural product in the field in front of the agricultural raking vehicle and/or on the windrow formed rear to the agricultural raking vehicle. The controller may control the speed of the agricultural raking vehicle to match the target speed. The actual speed of the agricultural raking vehicle may be determined based on a vehicle speed sensor or any suitable sensor associated with the agricultural raking vehicle and communicatively coupled to the controller. In response to determining (decision block 212) that the agricultural raking vehicle is unable to rotate any faster, and therefore, the power output is greater than a power limit, the controller may adjust/control (process block 214) the ground speed of the agricultural raking vehicle. In some embodiments, adjusting/controlling (process block 214) the ground speed may include decreasing the ground speed of the agricultural raking vehicle or the work vehicle by reducing power output, for example, by actuating a throttle associated with the agricultural raking vehicle or the work vehicle.

In response to determining (decision block 212) that the power output or speed of the agricultural raking vehicle is more than a percent tolerance different than the target settings, the flow diagram includes determining (decision block 216) whether a load (e.g., force) on the tine(s) is more than a percent tolerance different than a target tine load, which may be received as system inputs. In some embodiments, the tine load may be determined based on piezoelectric sensors associated with the tine(s) and communicatively coupled to the controller and/or may be based on agricultural product in the field in front of the agricultural raking vehicle and/or on the windrow formed rear to the agricultural raking vehicle. The tine load may increase as a result of the tines dragging on the ground, causing the raking member to collect dirt or debris instead of agricultural product. In response to determining (decision block 216) that the measured tine load is greater than the target tine load, the controller may adjust/control (process block 218) the height of the tines, as discussed above. Adjusting/controlling (process block 218) the height of the tines may include raising or lowering the tines. For example, the controller may lower the tines if the tine load is more than the percent tolerance different than the target settings. The flow diagram includes verifying (decision block 220) that the rake is operating at target operating parameters to store the corresponding operating parameters in the storage device (e.g., for future configuration of the agricultural raking vehicle). In response to verifying (process block 220), the controller may maintain (process block 222) the operating parameters. In some embodiments, the system inputs may be updated at any time before, during, or after performing raking operations.

Technical effects of the present disclosure include an agricultural raking vehicle which may include a plurality of raking members connected to a motor drive (e.g., a common rotatable drive) to control rotation of the plurality of raking members about an axis orthogonal to a ground on which the agricultural raking vehicle operates. Tines may rake and cause the agricultural product to engage with a deflector to form a windrow of agricultural product. A controller of the agricultural raking vehicle may achieve a target windrow quality by controlling certain components of the agricultural raking vehicle. The controller may control operating parameters, such as an agricultural raking vehicle ground speed, a work vehicle ground speed, a deflector position, a height and/or orientation (relative to the ground) of the tines, angular speed of the motor drive, and so forth, by controlling corresponding actuators. In this manner, an agricultural raking vehicle may enhance raking operations by improving the efficiency, flexibility, and quality of raking a field in accordance with aspects of the present embodiments.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural raking system, comprising:
an agricultural raking vehicle, comprising:
a motor drive;
a plurality of raking members mechanically coupled to the motor drive and configured to rake agricultural product via rotation about an axis substantially orthogonal to a field on which the agricultural raking vehicle travels, and wherein each raking member of the plurality of raking members comprises a plurality of tines; and
a sensor assembly comprising:
a first sensor configured to output a first signal indicative of a first profile of the agricultural product forward of the agricultural raking vehicle; and
a second sensor configured to output a second signal indicative of a second profile of a windrow of the agricultural product formed by the agricultural raking vehicle; and
a controller communicatively coupled to the motor drive and to the sensor assembly, the controller comprising a memory and a processor and configured to:
receive the first signal and the second signal;
determine a determined windrow quality by comparing the first profile to the second profile; and
control an angular speed of the motor drive, a ground speed of the agricultural raking vehicle, a height of the plurality of raking members above the field, or a combination thereof, based on a comparison of the determined windrow quality to a target windrow quality.

2. The agricultural raking system of claim 1, wherein the agricultural raking vehicle comprises a vertical actuator communicatively coupled to the controller, wherein the controller is configured to control the vertical actuator to adjust the height of the plurality of raking members.

3. The agricultural raking system of claim 1, wherein the first sensor comprises a first ultrasonic sensor communicatively coupled to the controller the second sensor comprises a second ultrasonic sensor communicatively coupled to the controller, or a combination thereof.

4. The agricultural raking system of claim 1, wherein the motor drive is positioned above or below a chassis of the agricultural raking vehicle.

5. The agricultural raking system of claim 1, wherein the controller is further configured to:
receive an indication of a target threshold value indicative of the target windrow quality; and
adjust the angular speed of the motor drive, the ground speed of the agricultural raking vehicle, the height of the plurality of tines, or a combination thereof, until the determined windrow quality is within the target threshold value.

6. The agricultural raking system of claim 1, wherein each of the plurality of raking members extend radially outward from the motor drive along a radial direction substantially parallel to the field.

7. The agricultural raking system of claim 6, wherein each raking member of the plurality of raking members is rotatable about the radial direction to adjust the height of the tines relative to the field.

8. The agricultural raking system of claim 1, further comprising a work vehicle configured to haul the agricultural raking vehicle and communicatively coupled to the controller, wherein the controller is configured to control the ground speed of the agricultural raking vehicle by actuating a throttle of the work vehicle.

9. The agricultural raking system of claim 1, further comprising a deflector configured to receive and direct a least a portion of the agricultural product from the plurality of raking members toward a region of the field to form a windrow.

10. The agricultural raking system of claim 1, wherein the agricultural raking vehicle comprises a shield configured to block debris from contacting a portion of the agricultural raking vehicle, and the plurality of tines of each raking member of the plurality of raking members is positioned radially outward from the shield.

11. A method for performing raking operations, comprising:
receiving a map of a field on which an agricultural raking system operates;
receiving a signal from a sensor assembly associated with the agricultural raking system;
in response to receiving the signal:
controlling a first component of the agricultural raking system to adjust a rotational speed of a plurality of raking members based on a target windrow quality, wherein the plurality of raking members are mechanically coupled to the first component and are configured to direct agricultural product toward a deflector of the agricultural raking system;
controlling a second component of the agricultural raking system to adjust a ground speed of the agricultural raking system based on the target windrow quality; and
controlling a third component of the agricultural raking system to control a height of a plurality of tines relative to a ground based on the target windrow quality, wherein each raking member of the plurality of raking members comprises the plurality of tines; and
actuating the first component, the second component, or a combination thereof, based on the map of the field.

12. The method of claim 11, wherein the first component comprises a motor drive configured to control the rotational speed of the plurality of raking members, the second component comprises a throttle of the agricultural raking system, and the third component comprises a wheel height actuator, a rotor height actuator, a raking member actuator, or a combination thereof.

13. The method of claim 11, wherein the agricultural raking system comprises an agricultural raking vehicle and a work vehicle, wherein the work vehicle is configured to haul the agricultural raking vehicle.

14. The method of claim 11, wherein the target windrow quality is based on an indication of a windrow size, an indication of a cross-sectional area of the windrow, an indication of a density of agricultural product in the windrow, or a combination thereof.

15. A method for performing raking operations, comprising:
- receiving, via a controller comprising a memory and a processor, a first signal from a first sensor and a second signal from a second sensor, wherein the first sensor is configured to output the first signal indicative of a first profile of agricultural product forward of an agricultural raking vehicle, the second sensor is configured to output the second signal indicative of a second profile of a windrow of the agricultural product formed by the agricultural raking vehicle, the agricultural raking vehicle comprises a motor drive and a plurality of raking members mechanically coupled to the motor drive, the plurality of raking members is configured to rake the agricultural product via rotation about an axis substantially orthogonal to a field on which the agricultural raking vehicle travels, and each raking member of the plurality of raking members comprises a plurality of tines;
- determining, via the controller, a determined windrow quality by comparing the first profile to the second profile; and
- controlling, via the controller, an angular speed of the motor drive, a ground speed of the agricultural raking vehicle, a height of the plurality of raking members above the field, or a combination thereof, based on a comparison of the determined windrow quality to a target windrow quality.

16. The method of claim 15, wherein controlling the height of the plurality of raking members comprises controlling a vertical actuator of the agricultural raking vehicle.

17. The method of claim 15, comprising:
- receiving, via the controller, an indication of a target threshold value indicative of the target windrow quality; and
- adjusting, via the controller, the angular speed of the motor drive, the ground speed of the agricultural raking vehicle, the height of the plurality of tines, or a combination thereof, until the determined windrow quality is within the target threshold value.

18. The method of claim 15, wherein controlling the ground speed of the agricultural raking vehicle comprises actuating a throttle of a work vehicle configured to haul the agricultural raking vehicle.

* * * * *